United States Patent [19]
Boulard et al.

[11] 4,431,992
[45] Feb. 14, 1984

[54] CIRCUIT FOR ADDRESSING A SET OF REGISTERS IN A SWITCHING EXCHANGE

[75] Inventors: Pierre Boulard; Jean-Yves Cozic, both of Lannion; Georges Fiche, Perros-Guirec, all of France

[73] Assignee: Societe Anonyme dite: Compagnie Industrielle Des Telecommunications Cit-Alcatel, Paris, France

[21] Appl. No.: 325,062

[22] Filed: Nov. 25, 1981

[30] Foreign Application Priority Data
Nov. 26, 1980 [FR] France ................. 80 25058

[51] Int. Cl.³ .................. H04Q 3/56; H04Q 9/02; H04Q 11/04
[52] U.S. Cl. .................. 340/825.53; 179/18 EB; 179/18 J; 370/84
[58] Field of Search .................. 364/200, 900; 179/18 EB, 18 J, 18 ES; 370/84; 340/825.53, 825.52

[56] References Cited

U.S. PATENT DOCUMENTS

| | | | |
|---|---|---|---|
| 3,737,873 | 6/1973 | Puccini | 364/900 |
| 4,022,849 | 1/1977 | Kotler et al. | 179/18 EB |
| 4,220,824 | 9/1980 | Castriotta et al. | 179/18 J |
| 4,347,582 | 8/1982 | Frank | 364/900 |

OTHER PUBLICATIONS

Colloque International De Commutation Electronique, Mar. 28–Apr. 2 1966, Paris (FR) E. Prager: "An Experimental Electronic System Using Reed Contacts and Centralized Pogram Control:, pp. 63 to 72, p. 68, line 16 to p. 70, line 16.
Colloque International De Commutation Electronique, Mar. 18–Apr. 2 1966, Paris (FR), G. Le Strat et al: Programmation de l'Autocommutateur Artemis, pp. 1424 to 1429, p. 1427 line 22, to p. 1429, line 5.

*Primary Examiner*—Thomas W. Brown
*Attorney, Agent, or Firm*—Sughrue, Mion, Zinn, Macpeak & Seas

[57] ABSTRACT

An addressing circuit has a register search counter (20) connected to a first multiplexer (24) and to a second multiplexer (25), a memory (33) connected to the output of the first multiplexer for writing the type of processing of each register, a register counter (26) connected to the second multiplexer which is itself connected by its output to three address registers (28, 30, 32) in series. The output of the second register (30) is connected to the first multiplexer to write address the memory under the control of a write signal (CRW). The register search counter read addresses the memory and stops as soon as a register requiring rapid processing is detected; the second multiplexer receives a transfer signal (ST) to transmit the address applied to the output of the register search counter; the register counter (26) stops during the transfer signal.

5 Claims, 3 Drawing Figures

CIRCUIT FOR ADDRESSING A SET OF REGISTERS IN A SWITCHING EXCHANGE

The invention relates to a circuit for addressing a set of registers in a switching exchange, the registers being used for controlling setting up and clearing down calls, e.g. telephone calls.

BACKGROUND OF THE INVENTION

In a switching exchange, a register is a storage area that may comprise 64 sixteen-bit words for example; this storage area contains all the information inherent to setting up and clearing down calls; a register is addressed at the beginning of a call setting up phase or of a call clearing down phase and it is released at the end of said call handling phase.

A switching exchange includes several sets of registers. In any one set of registers, the registers are processed cyclically; thus, systems are known in which a register is processed during 125 microseconds once every 8 milliseconds and other systems are known in which a register is processed during 32 microseconds once every 16 milliseconds.

The main feature of such processing resides in the fact that the processing time for each register is independent from the load on the switching exchange. This feature is an advantage in heavy traffic, since it ensures regular processing of each register; it also facilitates signal timing operations; in contrast, it does not allow processing time to be optimized e.g. for setting up or clearing down a call, since the same time is assigned to free registers and to busy registers and, likewise all busy registers are assigned the same time regardless of whether they are processing slow events (monitoring time delays, the state of a loop, etc.) or fast events (e.g. dialling analysis).

Preferred embodiments of the present invention optimize fast event register processing times while maintaining cyclic processing of all the registers.

SUMMARY OF THE INVENTION

The invention provides a circuit for addressing a set of registers in a telephone switching exchange in which fast event register processing times are optimized while cyclic processing of all registers is maintained. The circuitry of the invention includes a register counter, controlled by an advance signal, which is used to address a plurality of registers in repetitive time sequence or frames. First through third address registers are connected in series with one another. The first address register is used for addressing the set of registers for reading data from a designated register, while the third address register is utilized for addressing the set of registers for writing data into a particular one of the registers. Each address utilized by the address registers is first provided at the output of the register counter and at the output of the first register during a frame time interval defined by the advance signal. Subsequently, each address is transferred to the second address register where it is present during the next subsequent time interval, and then to the third address register where it is present during the second-following time interval.

A memory is provided having a number of words of storage equal to the number of registers to be controlled. A clock generator delivers a train of clock pulses equal in number to the number of storage locations in the memory and to the number of registers to be controlled. A first multiplexer has a first input connected to an output of a register search counter and a second input connected to the output of the second address register. The output of the first multiplexer is applied to address the memory. A first input of a second multiplexer is connected to the register search counter in the same manner as the first multiplexer, while a second input of the second multiplexer receives the output of the register counter.

In this circuitry, the input of the first multiplexer is enabled by a write signal applied to the first multiplexer. The input of the memory receives a particular, predetermined bit of an instruction being processed in one of the registers. A write signal enabling the value of the particular bit to be written into the memory is generated when the address of the register which is being processed is identical to the content of the second address register. The value of this particular bit is 1 when the instruction requires rapid processing, and otherwise is 0. The advance signal is blocked when a transfer signal, whose duration is equal to one time interval, is applied to the second multiplexer for a predetermined number of consecutive time intervals. Thereby, the first input of the second multiplexer is enabled and an address is then outputted by the register search counter which is inhibited as soon as a bit whose value is 1 is read into the memory. The search for a bit whose value is 1 is carried out in a time period of less than the number of times required for a transfer signal to enable the first input of the second multiplexer. The transfer signal introduces into the frame an extra time interval, once for the aforementioned number of time intervals, which extra time interval is assigned to a register containing an instruction which requires rapid processing.

The addressing circuit makes it possible to cyclically process N registers contained in a set of registers; it also allows registers to be processed in a cycle when they require a more rapid processing than cyclic processing. Of course, such registers form a part of the set of N registers.

For this purpose, a frame is constituted by N main time intervals each assigned exclusively to a corresponding register, plus n extra time intervals which last as long as the main time intervals and are uniformly spaced out in the frame. The extra time intervals are assigned on request to those registers which require rapid processing and which will thus be processed both at their cyclical time intervals and also during an extra time interval as soon as such an extra time interval occurs in the frame immediately following detection of a register requiring rapid processing.

The registers are therefore identical; when a register carries out an instruction, one bit of the instruction— e.g. bit 47—indicates whether this instruction needs to be carried out rapidly.

The value of bit 47 is 1 if the instruction needs to be carried out rapidly and 0 in the contrary case. During the processing of a register, bit 47 of the instruction is read and stored in a memory which is read between two extra time intervals so as to find out whether a register requires rapid processing. A given task requiring M instructions to be performed may have e.g. R instructions to be processed rapidly and L instructions to be processed slowly, i.e. at the register processing cycle rate; therefore, M=R+L.

To benefit as much as possible by processing the registers using an addressing circuit in accordance with the invention, it is important to optimize the R/L ratio and hence to choose judiciously the instructions which are to be carried out rapidly and those which are to be carried out slowly.

For a set of registers which consists of N=256 registers, for example, a frame is divided into a number N of main time intervals and, for example, a number n=64 of extra time intervals which last as long as the main time intervals. A frame which lasts 10 milliseconds, for example, is divided into 320 identical time intervals each lasting 31.25 microseconds; in this example, there is one extra time interval after every four main time intervals assigned to registers. Calculation shows that for an average extra time interval occupation rate of 0.8, the average real time gain in processing is equal to 12 relative to a multiregister regularly processed every eight milliseconds, as in the case of one known processing operation. To obtain this gain, the ratio R/L must remain lower than 0.15; above this value, the number of registers which require to be processed rapidly increases very fast and the gain drops.

Before describing one embodiment of an addressing circuit in accordance with the invention a brief reminder is given hereinbelow of what double programming is.

Programming is described in French Pat. No. 2,359,563 entitled "Time-division telecommunications exchanges". The processing time of a register, i.e. 31.25 microseconds, is divided into 32 elementary time intervals referenced $\mu 0$, $\mu 1 \ldots \mu 31$. For each register, there are 3 possible types of processing: PROLENT, SIMPRO and BIPRO.

PROLENT: Slow program.

Only one instruction is processed from $\mu 0$ to $\mu 15$. The operation of the processor unit is inhibited from $\mu 16$ to $\mu 31$. The address of the instruction to be carried out is in the first word of the register (word 0). This mode of operation is not widely used.

SIMPRO: Single program.

Two successive instructions of the same program are processed, one from $\mu 0$ to $\mu 15$, the other from $\mu 16$ to $\mu 31$. The address of the instruction to be carried out is always in word 0 of the register.

BIPRO: Double program.

Two parallel programs are carried out synchronously; e.g. one receives the dialling from a calling subscriber while the other program retransmits this dialling to another exchange.

1st program: the instruction is carried out from $\mu 0$ to $\mu 15$, the address of the instruction being in word 0 of the register.

2nd program: the instruction is carried out from $\mu 16$ to $\mu 31$, the address of the instruction being in word 32 of the register.

The type of processing to be applied during the elementary time intervals $\mu 16$ to $\mu 31$ is determined in accordance with the states of bits 45 and 46 of the instruction while the first instruction is being carried out and during processing of the register connected to the buffer memory which is being processed. For this purpose, the following code is used:

|  | Bit 45 | Bit 46 |
| --- | --- | --- |
| PROLENT | 1 | 0 or 1 |
| SIMPRO | 0 | 1 |
| BIPRO | 0 | 0 |

During some processing operations carried out in the BIPRO mode, it may become advisable to carry out a rapid program and a slow program. For example, a rapid program carries out translation operations on the first digits received from the calling subscriber while the slow second program cyclically processes the reception of the other digits; this second program must necessarily be slow since it must time pulses by reference to its processing cycle which is 10 milliseconds long. Hence the memory of the addressing circuit of the invention contains 2 bits per register number; one is written on the basis of bit 47 of the first instruction and the other on the basis of bit 47 of the second instruction.

When a SIMPRO program is executed, both bits of the memory are written systematically as 1 if either of the instructions has a bit 47 whose value is 1; when a PROLENT program is carried out both bits of the memory systematically both have the same value.

When the memory is being read, during extra time interval processing frame, both bits are tested: one enables processing by the processor unit during the elementary time intervals $\mu 0$ to $\mu 15$ and the other enables it during the elementary time intervals $\mu 16$ to $\mu 31$.

BRIEF DESCRIPTION OF THE DRAWINGS

An embodiment of the invention is described with reference to the accompanying drawings in which.

MORE DETAILED DESCRIPTION

Figure 1:
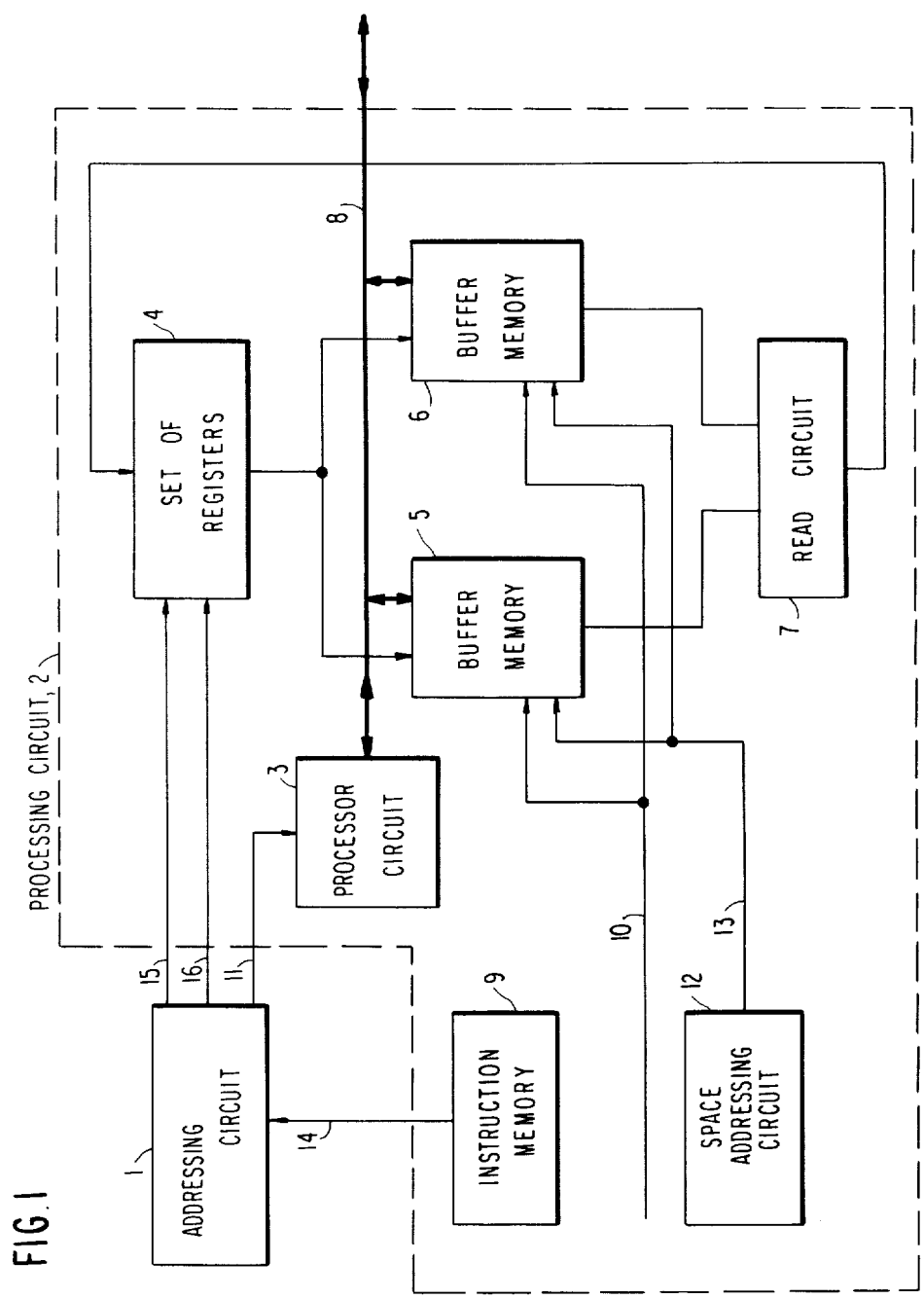
FIG. 1 is a block diagram of a circuit for processing registers, the circuit is associated with an addressing circuit in accordance with the invention.

FIG. 1 is a block diagram of an addressing circuit 1 in accordance with the invention associated with a register processing circuit 2.

The register processing circuit 2 does not form a part of the invention since it is of known type and, for example, of the type described in U.S. Pat. No. 4,119,803 entitled "Time-division Telecommunications Exchanges". The register processing circuit 2 is illustrated in block diagram form and includes: a processor unit 3, a set of registers 4 which is essentially a memory unit having, for example, 256 storage areas each containing 64 words, each storage area corresponding to one register, two buffer memories 5 and 6 and a read circuit 7. The addressing circuit 1 is connected to the set of registers 4 by a read line 16 and a write line 15.

Each buffer memory is connected to the output of the set of registers 4 and to a two-way data bus 8 which is also connected to a micro-instruction memory, not illustrated. Each buffer memory is connected firstly to an address control line 10 and secondly to a space addressing circuit 12 via a line 13.

The processor unit 3 is also connected to the buffer memories 5 and 6 by the data bus 8; the processor unit is connected to the addressing circuit 1 by an inhibit line 11.

An output from an instruction memory 9 is connected to the addressing circuit 1 by a marking wire 14.

In the register processing circuit 2, the buffer memories 5 and 6 act alternately one in read/write mode and the other in processing mode; this is made possible by an address signal applied to the address control line 10. This signal lasts 62.5 microseconds and has the value 1 during 31.25 microseconds and the value 0 during 31.25 microseconds.

When a buffer memory acts in read/write mode it is said to be operating in time addressing mode and when it acts in processor mode it is said to be operating in space addressing mode. The address signal controls the change over from time addressing operation to a space addressing operation and vice versa.

The buffer memories 5 and 6 are space addressed by the space addressing circuit 12 connected by the line 13 to the buffer memories 5 and 6.

Figure 2:
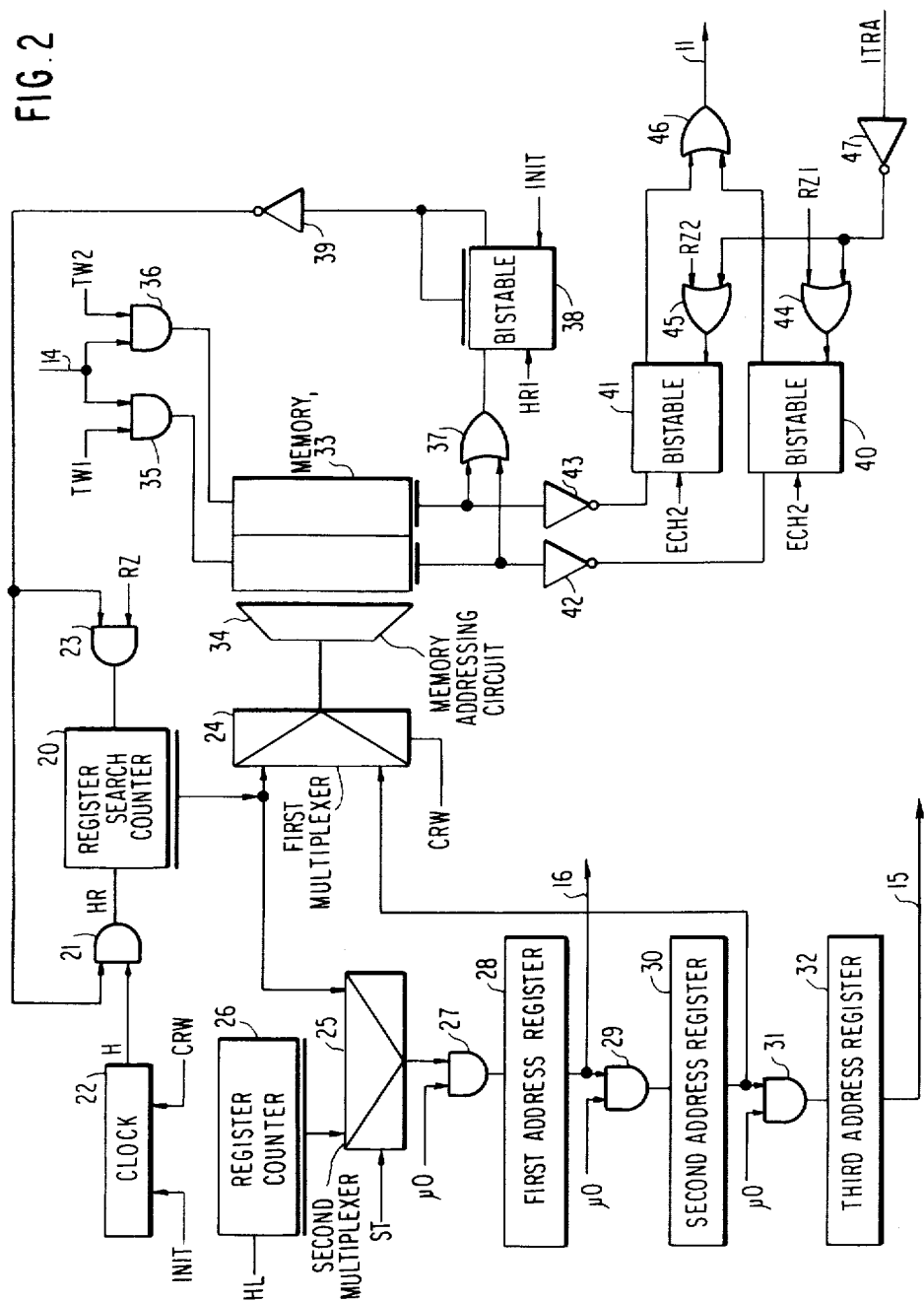
FIG. 2 is a diagram of the addressing circuit of FIG. 1.

FIG. 2 illustrates the addressing circuit of FIG. 1. A register search counter 20 receives a search signal HR from an AND gate 21, one of whose inputs is connected to the output of a clock 22 which delivers a clock signal H; the clock 22 receives an initialization signal INIT and a write signal CRW defined hereinafter; it is started by the initialization signal INIT and is inhibited during each period a write signal CRW is present. The clock signal H is composed of pulse trains each of which has in all 256 pulses. These pulses are delivered within a period of less than three time slots in a frame, i.e. within a period of less than 93.75 microseconds. The output of the search counter 20 is connected firstly to one input of a first multiplexer 24 and secondly to one input of a second multiplexer 25. A register counter 26 receives an advance signal HL every 31.25 microseconds and the output of the register counter 26 is connected to the other input of the second multiplexer 25 whose output is connected to one input of an AND gate 27 whose other input receives a signal representing the elementary time interval $\mu 0$, which signal is the first processing signal of a register as stated hereinabove. One output of the AND gate 27 is connected to a first address register 28 whose output is connected firstly to the set 4 of registers of FIG. 1 by the read line 16 and secondly to one input of an AND gate 29 whose other input receives the signal representing the elementary time interval $\mu 0$. The output of the AND gate 29 is connected to a second address register 30 whose output is connected firstly to the other input of the first multiplexer 24 and secondly to one input of an AND gate 31 whose other input receives the signal representing the elementary time interval $\mu 0$. The output of the AND gate 31 is connected to a third address register 32 whose output is connected to the set of registers 4, (FIG. 1), by the write line 15.

The first multiplexer 24 is controlled by the write signal CRW, and when the value of the write signal CRW is 1, the first multiplexer 24 outputs the address delivered by the second register 30, while it outputs the addresses delivered by the register search counter 20 when the write signal CRW is at value 0.

The second multiplexer 25 is controlled by a transfer signal ST to output the address supplied by the register search counter 20 while the transfer signal is at value 1, during a period of 31.25 microseconds, and to output the addresses delivered by the register counter 26 during a period of four time intervals, i.e. during $4 \times 31.25 = 125$ microseconds, while the value of the transfer signal is 0.

A memory 33 whose capacity is 256 two-bit words receives data relating to registers requesting rapid processing; this data is conveyed from the instruction memory 9, (FIG. 1), by the marking line 14; a memory addressing circuit 34 is connected to the output of the first multiplexer 24. Two AND gates 35 and 36 each have an input connected to the marking line 14; the other input of the AND gate 35 receives a first marking signal TW1; the other input of the AND gate 36 receives a second marking signal TW2; each of the AND gates 25, 36 allows one bit to be written in a word of the memory 33. At the output of the memory 33, each bit is applied to one input of OR gate 37 whose output is connected to a latching bistable 38 controlled by a clock signal HR1 which is the search signal HR delayer to take into account the time taken by the memory 33 to stabilize after the register search counter 20 has progressed; the bistable 38 is reset to zero by the initialization signal INIT.

The output of the bistable 38 is connected via an inverter 39 to the other input of the AND gate 21 and to one input of an AND gate 23 which receives a reset to zero signal RZ on its other input; the output of the AND gate 23 is connected to a reset to zero input of the register search counter 20.

The memory 33 has an output which corresponds to the bits written under the control of the first marking signal TW1 and which is connected via an inverter 42 to a bistable 40 controlled by a first sampling signal ECH1; the memory 33 also has an output which corresponds to the bits written under the control of the second marking signal TW2 and which is connected via an inverter 43 to a bistable 41 controlled by a second sampling signal ECH2. The bistable 40 has its output connected to one input of an OR gate 46 and the bistable 41 has its output connected to the other input of the OR gate 46 whose output is connected to the processor unit 3 (FIG. 1) by the inhibit line 11. The bistable 40 has its reset to zero input connected to an output of an OR gate 44 and the bistable 41 has its reset to zero input connected to an output of an OR gate 45; one input of each of the OR gates 44 and 45 is connected to an output of an inverter 47 whose input receives a rapid time interval signal ITRA in phase with and lasting as long as an extra time interval of the frame; the other input of the OR gate 44 receives a reset to zero signal RZ1 and the other input of the OR gate 45 receives a reset to zero signal RZ2.

Figure 3:
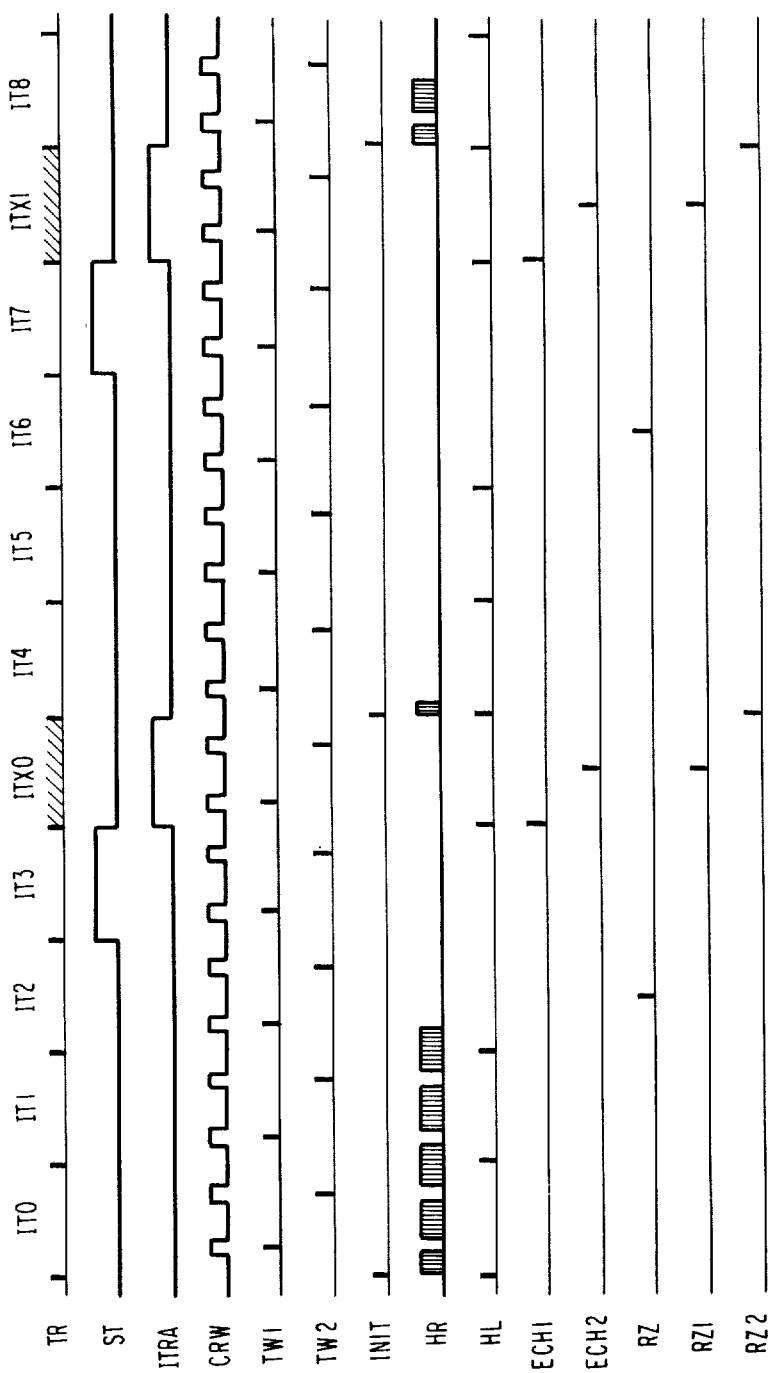
FIG. 3 is a waveform chart of the signals used in the addressing circuit of FIG. 2.

FIG. 3 is a timing diagram of the signals used in the addressing circuit. Frame TR corresponds to the addresses delivered by the second address register 30. To explain the operation of the addressing circuit, it is assumed that there are 256 registers in the set of registers 4 (FIG. 1) and that each register is read during 31.25 microseconds. Since the registers are written and processed alternately in the buffer memories 5 and 6, each register is processed during 31.25 microseconds, i.e. a register being processed is transferred from the set of registers into a buffer memory 31.25 microseconds previously. Transfer takes place when the address of the register is applied to the output of the first address register 28 and processing takes place when the same address is applied to the output of the second address register 30.

The register counter 26 which advances at the rate of the advance signal HL delivers the successive addresses of the registers; In FIG. 3, the time intervals of the frame TR assigned to registers E0, E1, E2, E3 are referenced IT0, IT1, IT2, IT3 and the extra time intervals are referenced ITX0, ITX1, . . . ; the frame TR corresponds to addresses 0, 1, 2, 3, X0, 4, 5, 6, 7 X1, 8, . . . , applied to the output of the second address register 30, The addresses 0, 1, 2, 3, 4, . . . delivered by the register counter 26 are delivered at the output of the second multiplexer 25 as long as the value of the transfer signal ST is 0; the value of this 31.25 microsecond signal is 1 after four addresses delivered by the register counter; in FIG. 2, the value of this signal is therefore 1 during the time interval which precedes each extra time interval ITX0, ITX1, .... The initializing signal INIT is a pulse delivered at the end of each extra time interval. The reset to zero signal RZ applied to the register search counter 20 via the AND gate 23 is a pulse delivered after a time which corresponds to the time necessary for the clock 72 to deliver 256 pulses; this reset to zero signal must also be delivered before the beginning of the fourth time interval of the frame TR. This signal RZ is applied to the register search counter 20 at the end of search only if this search is negative. In FIG. 3 it is observed that the advance signal HL is inhibited when the transfer signal appears; the register counter 26 must be stopped when the address of the register search counter 20 is taken into account by the second multiplexer 25.

The register E0 is kept for checking the proper operation of the exchange and its contents is always zero after processing since it always carries out the same instruction which always ends in its being erased; the register E0 is therefore always processed cyclically but it can be addressed in an extra time interval if none of the other registers requires rapid processing; in this case, the register E0 is not processed at all as will be explained during the description of operation. Therefore the value of bit 47 of the instruction is always 0 since this register never requires rapid processing.

Operation of the addressing circuit is as follows, assuming, as illustrated in FIG. 3, that the instant is that of the beginning of a frame TR in which the successive addresses of the registers are delivered by the second address register 30:

The register counter 26 delivers the address 1 of the register E1, the initialization signal INIT resets the bistable 38 to zero and the inverter 39 delivers a signal whose value is 1 to the AND gate 21; at the same time the clock 22 starts up and the clock signal H is applied by the AND gate 21 to the register search counter 20 which continues to count from the value at which it stopped; the addresses which it delivers are applied via the first multiplexer 24 to the addressing circuit 34 of the memory 33, thus causing reading thereof; as long as the value of the two bits of each word of the memory is 0 the output signal of the OR gate 37 is zero, the value of the bistable 38 is still 0 at the output and the value of the output signal of the inverter 39 is 1. The address 1 delivered by the register counter 26 is applied via the second multiplexer 25 to the first address register 28; this address is found again on the read line 16, thus causing the contents of the register E1 in the set of registers 4 to be transferred into a buffer memory, e.g. 5, if the buffer memory is write enabled by the signal applied to the addressing control line 10. When the register counter 26 delivers the address 1, this address is transferred into the first address register 28 and the address 0 is transferred from the first address register 28 into the second address register 30 whose output is connected to the first multiplexer 24. Still at this instant which corresponds to the initialization signal INIT, the contents of the register E0 are in the buffer memory 6 and the signal on the control line 10 allows the register E0 to be processed. While the buffer memory 6 is being processed, the word 0 of the register E0 is read during the elementary time interval µ0 and this word contains the address of the instruction to be read in the instruction memory 9; on reading, bit 47 of this instruction is applied by the marking line 14 to the AND gates 35 and 36; its value is 0 and it is written in the two bits of the memory at the instants when the signals TW1, and TW2 which correspond to the write signal CRW, occur, which enables the first multiplexer 24, thus enabling the memory 33 to be addressed with the address 0 delivered by the second address register 30 and which corresponds to the register E0.

Generally, during the time interval which corresponds to the processing of a register whose address is applied to the output of the second address register 30, there are two pulses of the write signal CRW; the first corresponds to the instruction addressed during the elementary time interval µ0 and the second corresponds to the instruction addressed during the elementary time interval µ16. In the case of a single program, SIMPRO, as both instructions necessarily belong to the same program, the two divisions of the memory are written with the same values depending on the value of bit 47 of the second instruction. In the case of a slow program PROLENT, no instruction is read during the elementary time interval µ16 and consequently the value of the bit from the memory 33 which corresponds to the AND gate 36 is 0 for the register considered. In the case of a double program BIPRO, each bit 47 of the two instructions addressed by the register which is being processed has a value of 0 or 1 but the values are not related to each other.

The pulses of the write signal CRW inhibit the operation of the clock 22 for as long as they are delivered and allow the memory 33 to be addressed by the address applied to the output of the second address register 30 via the first multiplexer 24. When the memory 33 is addressed, the AND gate 35 is enabled by the first marking signal TW1 and the AND gate 36 is enabled by the second marking signal TW2. The first marking signal TW1 allows the bit 47 which corresponds to instruction addressed during the elementary time interval µ0 to be written in the memory 33; the second marking signal TW2 allows the bit 47 which corresponds to instruction addressed during the elementary time interval µ16 to be written in the memory 33.

When the register counter 26 delivers the address 2, this address is written in the first address register 28, the address 1 is transferred from the first address register 28 to the second address register 30 and the address 0 is transferred from the second address register to the third address register 32; the address 0 is therefore applied to the write line 15. When a buffer memory is in the write state, it is also in the read state so that its contents can be written into the set of registers 4 at the address corresponding to the register which has been processed in said buffer memory.

Therefore, in the present case, the contents of the register E2 are read in the set of registers 4, the address 2 of these contents being applied to the read line 16 and these contents being written in the buffer memory 6 and the contents of the buffer memory 6 are written in the set of registers 4 at the location assigned to the register E0, the set of registers 4 being addressed during the write operation by the address 0 applied to the write line 15, i.e. the address of the register E0.

Then the register counter 26 delivers the address 3 which is transferred to the first address register 28; the address 2 is transferred from the first address register to the second address register 30 and the address 1 is transferred to the third address register 32. The contents of the register E3 is transferred to the buffer memory 5 and at the same time, the buffer memory 5 is read to write its contents in the register E1; the register E2 whose contents are applied to the buffer memory is in the processing mode.

Since no advance signal HL is applied to the register counter 26, 31.25 micro-seconds after the register counter has displayed the address 3, it is inhibited, but since the transfer signal ST is applied to the second multiplexer 25, the address delivered by the register search counter is transferred to the first address register 28. In signal HR of FIG. 3, it is supposed that the register search counter is counting 256 pulses, since no register requires rapid processing. It is also supposed that no rapid processing is required for the register corresponding to the address delivered by the register search counter 20 which is stopped when the transfer signal ST is applied, since the clock 22 delivers only 256 clock signals. Consequently, the value of the 2 bits at the output of the memory 33 is 0; the value of the signal at the output of the inverter 39 is 1 and when the reset to zero signal RZ is applied to the AND gate 23, the register search counter 20 is reset to zero and delivers the address 0 which corresponds to the register E0. Therefore the address 0 is transferred to the first address register 28 when the transfer signal ST is applied to the second multiplexer 25; the address 3 is transferred from the first address register to the second address register 30 and the address 2 is transferred from the second address register to the third address register 32. The contents of the register E0 are transferred to the buffer memory 6 which is also read for its contents to be written in the register E2; the register E3 whose contents are contained in the buffer memory 5 is in the processing mode.

Then the register counter 26 resumes its counting; when it delivers the address 4, the address 0 corresponding to the register E0 is delivered by the second register 30; the register E0 whose contents are contained in the buffer memory 6 is in the processing mode during the extra time interval ITX0 of the frame TR. The value of the two bits from the memory 33 is 0 and after being inserted at 42, 43 these signals are transferred to the bistables 40 and 41 on the arrival of the first and second sampling signals ECH1 and ECH2 respectively during the extra time interval ITX0. These bistables are permanently reset to zero since the inverter 47 delivers a signal whose value is 1 and the value of the signal ITRA is itself 0, except during the period corresponding to an extra time interval. The OR gate 46 receives a 1 level signal from both bistables 40 and 41 and then delivers a signal whose value is 1 on the inhibit line 11, thus inhibiting the processor unit 3 (FIG. 1), thereby preventing the register E0 from being processed as stated previously.

When the register counter 26 delivers the address 5, the initialization signal INIT causes the clock 22 to operate and the register search counter 20 counts from zero. In the signal HR of FIG. 3, it is supposed that the register search counter is stopped in mid count subsequent to the detection of a register which required rapid processing, e.g. register E2. The register search counter 20 is stopped as follows: when the memory 33 is addressed by the register search counter 20, the two bits of each word are read and applied to the OR gate 37; as soon as a bit has a value of 1 the output of the bistable 38 changes to 1 and the signal delivered by the inverter 39 assumes the value 1, thereby inhibiting the AND gate 21 and stopping the counter. The register search counter is therefore stopped at the value 2 which is the address of the register E2. The reset to zero signal RZ is inoperative since the value of the signal delivered by the inverter 39 is 0; therefore, register search counter 20 is not reset to zero. The address 2 is applied to the first address register 28 via the second multiplexer 25 under the control of the signal ST; when the register counter 26 delivers the address 8, the address 2 is transferred to the second address register 30 and the contents of the register E2 are in the processing mode during the extra time interval ITX1; when the second address register 30 has received the address 2, said address is applied to the input of the first multiplexer 24 connected to the output of the second address register; this address is sent to the addressing circuit 34 during the time intervals of the writing signal CRW, thereby allowing the two bits 47 of the instructions addressed by the register which is being processed to be written in the memory 33. In another respect, at the beginning of the extra time slot ITX1; the value of the bit of the memory 33 corresponding to the AND gate 35 is taken into account via the inverter 42 by the bistable 40 under the control of the first sampling signal ECH1 before the new value is written in the memory; likewise, the value of the bit of the memory 33 corresponding to the AND gate 36 is taken into account via the inverter 43 by the bistable 41 under the control of the second sampling signal ECH2 before the new value is written in the memory.

If the value of the bit delivered by the memory 33 corresponding to the gate 35 is "1", the processor unit is not inhibited during the interval of time defined by the time intervals $\mu 0$ to $\mu 15$. If the value of the bit delivered by the memory 33 corresponding to the gate 36 is "11", the processor unit is not inhibited during the time defined by the time interval $\mu 16$ to $\mu 31$. It is therefore seen that the processor unit 3 can be enabled for the processing of one instruction and inhibited for the processing of another instruction if processing is being carried out in double program BIPRO mode of operation, for example.

When the registers are being cyclically processed the bistables 40 and 41 do not take into account the bits delivered by the memory 33 either during the search phase for a register requiring rapid processing or when the register search counter 20 is stopped after having found a register requiring rapid processing. The first and second sampling signals ECH1 and ECH2 allow the values of the bits at the output of the memory 33 to be taken into account only during the processing of a register during an extra time interval ITX0, ITX1, ITX2 . . . ; the bistables 40 and 41 are kept permanently at zero by the extra time interval signal ITRA. It will also be observed that during an extra time interval of the frame, each bistable is reset to zero by a reset to zero signal RZ1 or RZ2. Thus if the value of the output of the bistable 40 was 1, the bistable 40 is reset to zero whereas the bistable 41 receives the second sampling signal ECH2 so as to allow the signal on the inhibit line 11 to have the required value to enable or inhibit the processor unit as a function of the value of each bit delivered by the memory 33; the second reset to zero signal RZ2 comes into action at the end of the extra time interval.

In the above description of an embodiment of an addressing circuit, it is supposed that the frame has one extra time interval ITX0, ITX1 . . . after four normal time intervals; of course, generally, it is possible to introduce an extra time interval after m time normal intervals; this is done easily by modifying the frequency of the transfer signal since extra time intervals are introduced into a frame when the transfer signal ST is applied to the second multiplexer 25 so as to transmit the address applied to the output of the register search counter 20 which is stopped when a register requiring rapid processing is detected, as set forth hereinabove. FIG. 3 makes it clear that the register search counter 20 must end its search in a shorter time than m−1 time intervals so as to be effectively stopped when the transfer signal ST is applied to the second multiplexer. Indeed, it will be remembered that the frame TR of FIG. 3 is identical to the frame at the output of the second multiplexer 25 and therefore at the output of the first register 28 but delayed in time by one time interval relative thereto, since the frame TR illustrated in FIG. 3 is that obtained at the output of the second address register 30.

We claim:

1. A circuit for addressing a set of registers of a switching exchange, said circuit comprising:
   a register counter controlled by an advance signal to address a plurality N of registers in a repetitive frame;
   a first address register, a second address register and a third address register connected in series, the first address register addressing said set of registers for reading from a register, the third address register addressing the set of registers for writing to a register, each address being present at the output of the register counter and at the output of the first register during one frame time interval defined by said advance signal, each address being then transferred to the second address register where it is present during a first time interval, and then to the third address register where it is also present during a second time interval following said first time interval;
   a memory having N words of at least one bit each;
   a clock which delivers a train of N pulses;
   a register search counter;
   a first multiplexer having a first input connected to the register search counter, a second input connected to the output of the second address register, and an output connected to an addressing circuit of the memory;
   a second multiplexer having a first input connected to the register search counter and a second input connected to the register counter;
   wherein the input of the first multiplexer is enabled by a write signal applied to the first multiplexer; wherein the input of the memory receives a particular bit of an instruction which is being processed in a register, with the write signal enabling the value of said particular bit to be written into the memory when the address of the register which is being processed is contained in the second address register with the value of said particular bit being 1 when the instruction requires rapid processing and otherwise being 0; and wherein the advance signal is blocked when a transfer signal whose duration is equal to one time interval is applied to the second multiplexer after m time intervals to enable its first input and to transmit an address displayed by the register search counter which is inhibited as soon as a bit whose value is 1 is read in the memory, the register search counter carrying out a search for a bit whose value is 1 in a time of less than m−1 time intervals, said transfer signal introducing in the frame one extra time interval once every m time intervals, said extra time interval being assigned to a register whose instruction requires rapid processing.

2. A circuit for addressing a set of registers according to claim 1, wherein under the control of an initialization signal, the clock starts a time interval after the end of the transfer signal; wherein it is temporarily inhibited by each pulse of the write signal; and wherein the train of N pulses is delivered in a time shorter than m−1 time intervals.

3. A circuit for addressing a set of registers according to claim 1, wherein a reset to zero signal is applied to the register search counter after N words of the memory are read and when none of these words has a bit with a value of 1.

4. A circuit for addressing a set of registers according to claim 1, wherein each word of the memory has two bits each assigned to one instruction when a register processes two instructions in one time interval.

5. A circuit for addressing a set of registers according to claim 4, wherein each output of the memory which corresponds to a bit of a word is connected via a respective inverter to a corresponding bistable, each bistable being read enabled by a respective sampling signal, when the register search counter is inhibited and is delivering the address which is taken into account by the transfer signal and which is contained in the second address register to process the corresponding register during a processing time, a first one of said sampling signals being applied to a first one of said bistables at the beginning of the processing time, with a second one of said sampling signals being applied to a second one of said bistables in the middle of the processing time, the output signal of each bistable being applied to a processor unit which performs the processing to inhibit its operation when the value of the corresponding bit delivered at the output of the memory is 0.

* * * * *